excellent in-
United States Patent Office 3,261,743
Patented July 19, 1966

3,261,743
CONTROLLING NEMATODES WITH ORGANIC PHOSPHONOTHIOITES AND PHOSPHONOTHIOATES
John W. Wilson, Jr., Richmond, Va., assignor to Socony Mobil Oil Company, Inc., a corporation of New York
No Drawing. Filed Apr. 3, 1964, Ser. No. 357,270
13 Claims. (Cl. 167—22)

This invention relates to a method for the control of free-living, plant-parasitic nematodes, such as the root-knot nematode. Broadly, the invention is directed to the control of nematodes by exposing them to toxic quantities of organic phosphorus compounds having their carbon nuclei bound to phosphorus through a combination of oxygen, sulfur, and carbon linkages.

Control of nematodes is difficult, and eradication has been all but impossible. This has been due, in part at least, to the difficulty in proving nematodes to be the cause of trouble in plants exhibiting poor growth. Proof requires close inspection of plant roots or isolation of the nematode from soil, and since nematodes seldom kill plants they attack, growers are often inclined to blame poor plant growth on inadequate soil fertility or adverse weather conditions. The problem has nevertheless, been recognized, and in spite of the seemingly insurmountable task, several measures have at one time or another been taken to control the pests. For example, rotation of crops to control nematode populations by growing plants which are not normally parasitized by a given specie of nematode has been practiced. This, however, is impracticable where monoculture prevails.

In view of the complex structure of the nematode, attempts to discover effective toxicants from among materials known to be lethal to other pests have been futile. Therefore, in spite of the fact that many excellent insecticides exist today, the nematode population continues to increase. There is no known correlation between insecticidal and nematocidal activity, and discovery of chemicals with the special requisites for nematocidal activity has not been aided by the increasing number of insecticide discoveries. Therefore, the use of chemicals for nematode control is a comparatively recent development.

The nematocide, to be effective, must meet several stringent requirements. First of all, since the nematode, as well as the egg thereof, is protected by a difficultly permeable membrane, the toxicant must have the ability both to penetrate the membrane and to destroy the nematode. Toxicants must also be readily dispersible in soils or in other environments of the organism and be stable therein for a period of time sufficient to destroy the pest. Since the reason for ridding soils of nematode infestations is to provide a beneficial growing medium for plants, the nematocide must be non-phytotoxic, or its phytotoxicity must to be short-lived. A phytotoxic nematocide, either itself or some decomposition product of it, should be such that, prior to crop planting, it is removed from the soil by evaporation, by rain washing, or by soil bacterial action.

Ideally, the nematocide should be of a nature that it can, if desired, be applied to the soil while crops (this term as used herein is intended to mean not only food crops but also flowers, ornamentals, fruit trees, etc.) are growing, and it should have a fairly long residual life, i.e. at least of sufficient time to be effective as a nematocide. It must not leave an objectionable level of residue in the plants growing or to be grown in the treated soil, its mammalian toxicity must be such that the applicator is exposed to minimum danger, and it must be amenable to conventional methods of application.

In contrast to the ideal nematocide, the most frequently used toxicants have, until recently, been gaseous fumigants. These, however, are generally soil sterilants, and they kill plants as well as pests. Furthermore, since fumigant nematocides are most effective only when the area to be treated is covered to prevent loss of active material, they are not practical for application to infested areas by conventional methods. For example, they cannot be applied as a surface spray because of their volatility.

There are now several phosphatic contact nematocides in existence. Some of these are set forth in U.S. Patents 2,761,806 and 3,112,244. However, it seems that extremely high concentrations of some of these disclosed contact nematocides are required for control. For example, the esters disclosed in 2,761,806 are applied at the rate of about 280 pounds per acre. Even for relatively cheap materials, it is seen that this rate of application would be prohibitively expensive.

It is therefore an object of this invention to provide new methods for ridding infested soils of nematodes.

It is a further object to provide groups of toxic compositions which are useful in the control of nematodes.

Another object of this invention is to provide nematocides which have a reasonable residual life and which have no herbicidal or other plant inhibiting effects at the rates necessary for nematode control.

Other objects will become apparent from the remainder of the disclosure.

In accordance with this invention, it has been found that the above objects are accomplished with organic phosphorus compounds represented by the formula

wherein R and R' are alkyls having from 1 to 4 carbon atoms, inclusive, and M is a member of the group consisting of —OR", —(O)OR", and —(S)OR", wherein R" is a member of the group consisting of aliphatic and haloaliphatic, said aliphatic and haloaliphatic having from 1 to 12 carbon atoms, inclusive.

More particularly the compounds are represented by the formulas (1) 

and (2) 

wherein R, R' and R" are as defined above, and X is selected from the group consisting of oxygen and sulfur. These compounds are effective against many kinds of nematodes, such as the Meloidogyne species, other endo and ecto parasitic nemas, and hardy saprophytic types such as *Panagrellus redivivus*.

Compounds of group (2) may be prepared from the appropriate alcohol and S-alkyl alkylphosphonohalidite.

Specifically, O-methyl S-propyl methylphosphonothioite is prepared as follows:

Into a suitable reaction vessel equipped with a stirrer, thermometer, reflux condenser and gas addition means were placed 165 parts (by weight here and throughout) of hexane, 32.0 parts of methanol and 0.1 part of methyl red. 156.6 parts of S-propyl methylphosphonochloridite was placed in 66 parts of hexane, and this was added to the mixture in the reaction vessel at 0–5° C., while simultaneously adding NH₃ at a rate sufficient to maintain the reaction mixture neutral to methyl red. With vigorous stirring, the addition required one hour. The reaction mixture was stirred for 10 minutes, 400 parts of 20% NaOH was used to wash out ammonium chloride, and then the aqueous phase was separated from the organic layer. Solvent was removed to a final pot temperature of 60° C. and a final pressure of 75 mm. of Hg.

The oxygenated compounds of group (1) may be prepared by oxidation of the appropriate phosphonothioite with oxygen, an oxygen-containing gas, or hydrogen peroxide or other useful oxidizing agent. For example, oxidation of the above compound may be accomplished by bubbling air into the compound at 100° C. until titration with iodine indicates no remaining $P^{+3}$.

The phosphonodithioates of group (1) are prepared by adding sulfur or other sulfurizing agent to the desired phosphonothioite at 100–110° C., until no more $P^{+3}$ is present as indicated by titration with iodine.

The organic phosphorus compounds are useful for the control of nematodes when applied at the rate of between about 4 to about 64 pounds per acre of the active ingredient. The compounds may be applied to the soil in the form of sprays or injections, or they may be applied with a solid vehicle or extender. For example, they may be mixed with soil, saw dust, sand, clay, or any convenient carrier which will aid in the uniform distribution of the chemical over the ground. As a general rule, solid carriers which are acceptable are those which are non-hygroscopic, thereby preventing the compositions from caking. In addition to soil, saw dust, etc., examples of suitable solid carriers are kaolinite, bentonite, attapulgite, etc.

Liquid compositions for nematocidal uses may be solutions or liquid dispersions or emulsions. The liquid medium used will depend largely upon the physical and chemical nature of the active ingredient. If the compound is water soluble, water alone will suffice as the carrier. Where the active ingredient is insoluble in water, or substantially so, it is desirable to add a small amount of an inert, non-phytotoxic organic solvent which can be readily dispersed in the aqueous medium to produce a heterogeneous dispersion of the active component.

A useful liquid nematocidal formulation is one containing a surface active agent which aids in the uniform distribution of the formulation in the soil. An effective liquid formulation may include the active component, acetone, water and a surface active agent such as polyoxyethylene sorbitan monolaurate. Among other wetting agents or emulsifiers which are useful are a blend of polyoxyethylene sorbitol esters of mixed fatty and resin acids and alkyl aryl sulfonates and a blend of polyoxyethylene sorbitan esters of fatty and resin acids and alkyl aryl sulfonates. The three above-named agents are sold under the names Tween–20, Atlox G–3396, and Atlox G–2081, respectively. The solution or dispersion is conveniently sprayed or poured evenly over the area to be treated and is washed in with water. Mixtures of the nematocides with solid carriers may be distributed over the soil in any convenient manner and then mixed with the soil by plowing, disking, etc. Liquid applications can also be plowed or disked into the soil or they may be left to the action of natural rainfall. In any event, it is essential that the material be dispersed below ground. Normally a depth of 2–8 inches will be required if good control of nematode infestations is to be achieved.

Application of the chemicals of this invention to food-crop land prior to planting is preferable, one reason being that it is less difficult to treat a field wherein no crops are growing. Prior treatment can in no way reduce the length of the growing season, for, as pointed out above, the chemicals are not phytotoxic when used in nematocidal amounts. Crops can, therefore, be planted immediately after treatment, if desired. This is very important, especially in some zones wherein the growing season is relatively short and any method for nematode control which tends to shorten the growing season cannot be tolerated.

The following will illustrate the efficaciousness of the chemicals of this invention as nematocides. The description of the methods used and the examples of the tables are merely illustrative, and they must not be construed as limitations on the scope of the invention. The scope will include equivalent compounds and methods for applying them which accomplish the results of this disclosure.

The nematocidal activity of the compounds presented in the tables below was determined in a number of ways. The descriptions below will illustrate the methods employed.

*Contact pot test*

Seventy-five mg. of each compound tested, representing the amount needed to treat three 4-inch pots of nematode infested soil at the rate of 64 pounds per acre, was formulated with 10 ml. of acetone, 500 mg. of Tween–20 and 90 ml. of water. This preparation was diluted with water to give 16, 8, or 4 pounds per acre rates. A 126-ml. portion of each rate was used to treat sufficient soil to fill three 4-inch pots.

Sterile test soil was infested by mixing it with soil in which root knot-infested tomato plants had grown for three months. Enough soil to fill three 4-inch pots was removed, and was mixed with 126 ml. of each concentration as mentioned in the paragraph next above.

The soil was potted and placed in a sand bench for two weeks, receiving normal greenhouse watering during this period. At the end of this period, a tomato seedling (three weeks old) was transplanted to each pot. It was allowed to grow for 35 days. At the end of this period, the plant was uprooted, and two grams of the roots were cut away. The root knots were counted and compared to plants growing in non-treated soil. The results, expressed as percent control, are averages of the three replicates at each concentration.

*Drench test*

This test was essentially the same in all respects as the contact test, except that the formulation was poured over the surface after potting. 50 ml. of each formulation was used per pot.

| Compound | Contact, lb./acre | | | Drench, lb./acre | | |
|---|---|---|---|---|---|---|
| | 16 | 8 | 4 | 64 | 16 | 8 |
| $CH_3(C_3H_7S)P(S)OCH_3$ | 100 | 100 | 100 | 100 | | |
| $CH_3(C_3H_7S)P(S)OC_2H_5$ | 100 | 100 | 50 | 90 | 90 | |
| $CH_3(C_3H_7S)POCH_3$ | 95 | 90 | 85 | 100 | | |
| $CH_3(C_3H_7S)P(O)OCH_3$ | 95 | | 85 | 100 | 100 | 100 |
| $CH_3(C_3H_7S)POC_2H_5$ | 90 | 70 | 50 | 90 | | |
| $CH_3(C_3H_7S)P(O)OCH(CH_3)_2$ | 100 | 100 | 100 | 100 | 90 | 100 |
| $CH_3(C_3H_7S)P(S)OC_{12}H_{25}$ | 90 | | | | | |
| $CH_3(C_3H_7S)P(S)OCH_2CH_2Cl$ | 95 | | | | | |
| $CH_3(C_3H_7S)P(S)OCH_2C\equiv CH$ | 100 | | | | | |

The following will illustrate other chemicals coming within the scope of the invention:

$$CH_3(C_4H_9S)POC_4H_9$$

$$C_2H_5(C_4H_9S)P(S)OC_4H_9$$

$$C_4H_9(C_4H_9S)P(O)OCH_2CH_2CH_2Br$$

$$C_2H_5(C_3H_7S)POCH_2CH_2CH_2Br$$

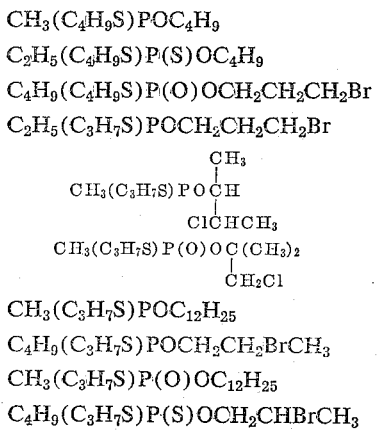

$$CH_3(C_3H_7S)P(O)OC(CH_3)_2CH_2Cl$$

$$CH_3(C_3H_7S)POC_{12}H_{25}$$

$$C_4H_9(C_3H_7S)POCH_2CH_2BrCH_3$$

$$CH_3(C_3H_7S)P(O)OC_{12}H_{25}$$

$$C_4H_9(C_3H_7S)P(S)OCH_2CHBrCH_3$$

$CH_3(C_3H_7S)P(S)OC(CH_3)_2$
                    |
                    $CH_2Cl$ $CH_3(C_3H_7S)POCH_2C\equiv CH$ The term "soil," as used herein is meant to include all conventional "soils" as stated in Webster's New International Dictionary, Second Edition, Unabridged, published in 1954 by G. and C. Merriam Company, Springfield, Massachusetts. The term is meant to include any substance or medium in which vegetative organisms may take root and grow. It includes not only earth, but also and manure, mulch, compost, etc. which can support plant life.

I claim:

1. A method of controlling nematodes which comprises applying thereto a nematocidal amount of a compound of the formula $$\begin{matrix} RS \\ & \searrow \\ & \phantom{x}PM \\ & \nearrow \\ R' \end{matrix}$$

wherein R and R' are alkyls having from 1 to 4 carbon atoms, inclusive, and M is a member of the group consisting of —OR", —(O)OR", and —(S)OR", wherein R" is a member of the group consisting of aliphatic and haloaliphatic radicals, said aliphatic and haloaliphatic radicals having from 1 to 12 carbon atoms, inclusive.

2. A method of controlling nematodes which comprises applying thereto a nematocidal amount of a compound of the formula $$\begin{matrix} RS \\ & \searrow \\ & \phantom{x}POR" \\ & \nearrow \\ R' \end{matrix}$$

wherein R, R' and R" have the same meaning as in claim 1.

3. The method of claim 2 wherein the compound is $CH_3(C_3H_7S)POCH_3$.

4. The method of claim 2 wherein the compound is $CH_3(C_3H_7S)POC_2H_5$.

5. A method of controlling nematodes which comprises applying thereto a nematocidal amount of a compound of the formula $$\begin{matrix} RS \\ & \searrow \\ & \phantom{x}P(S)OR" \\ & \nearrow \\ R' \end{matrix}$$

wherein R, R' and R" are as defined in claim 1.

6. The method of claim 5 wherein the compound is $CH_3(C_3H_7S)P(S)OCH_3$.

7. The method of claim 5 wherein the compound is $CH_3(C_3H_7S)P(S)OC_2H_5$.

8. The method of claim 5 wherein the compound is $CH_3(C_3H_7S)P(S)OC_{12}H_{25}$.

9. The method of claim 5 wherein the compound is $CH_3(C_3H_7S)P(S)OCH_2C\equiv CH$.

10. The method of claim 5 wherein the compound is $CH_3(C_3H_7S)P(S)OCH_2CH_2Cl$.

11. A method for controlling nematodes which comprises applying thereto a nematocidal amount of a compound of the formula $$\begin{matrix} RS \\ & \searrow \\ & \phantom{x}P(O)OR" \\ & \nearrow \\ R' \end{matrix}$$

wherein R, R' and R" are as defined in claim 1.

12. The method of claim 11 wherein the compound is $CH_3(C_3H_7S)P(O)OCH_3$.

13. The method of claim 11 wherein the compound is $CH_3(C_3H_7S)P(O)OCH(CH_3)_2$.

References Cited by the Examiner

UNITED STATES PATENTS

| | | | |
|---|---|---|---|
| 2,906,661 | 9/1959 | Baker et al. | 167—22 |
| 3,112,244 | 11/1963 | Goyette | 167—22 |
| 3,162,570 | 12/1964 | Wilson | 167—22 |

LEWIS GOTTS, *Primary Examiner.*

S. K. ROSE, *Assistant Examiner.*